(12) United States Patent
Ahluwalia et al.

(10) Patent No.: US 8,017,531 B2
(45) Date of Patent: *Sep. 13, 2011

(54) COMPOSITE MATERIAL

(75) Inventors: Younger Ahluwalia, Desoto, TX (US); Matti Kiik, Richardson, TX (US); Thomas D. Karol, Dallas, TX (US)

(73) Assignee: ElkCorp, Dallas, TX (US)

( * ) Notice: Subject to any disclaimer, the term of this patent is extended or adjusted under 35 U.S.C. 154(b) by 669 days.

This patent is subject to a terminal disclaimer.

(21) Appl. No.: 10/766,652

(22) Filed: Jan. 27, 2004

(65) Prior Publication Data

US 2004/0235379 A1    Nov. 25, 2004

Related U.S. Application Data

(63) Continuation-in-part of application No. 09/955,395, filed on Sep. 18, 2001, now Pat. No. 6,858,550, and a continuation-in-part of application No. 10/354,220, filed on Jan. 29, 2003, now abandoned, and a continuation-in-part of application No. 10/354,219, filed on Jan. 29, 2003, now Pat. No. 7,521,385, and a continuation-in-part of application No. 10/354,216, filed on Jan. 29, 2003, now abandoned.

(51) Int. Cl.
  *B32B 17/04* (2006.01)
  *B32B 15/14* (2006.01)
  *B32B 27/04* (2006.01)
  *B32B 27/12* (2006.01)

(52) U.S. Cl. ............ 442/136; 442/79; 442/97; 442/123; 442/148; 442/180; 442/376; 442/378

(58) Field of Classification Search .................. 442/136, 442/148, 180, 376, 378, 79, 97, 123, 180.376; 428/402, 920, 921
See application file for complete search history.

(56) References Cited

U.S. PATENT DOCUMENTS

| | | | |
|---|---|---|---|
| 3,062,682 A | 11/1962 | Morgan et al. | 264/54 |
| 3,248,259 A | 4/1966 | Borsellino et al. | 442/148 |
| 3,512,192 A | 5/1970 | Simon | 5/698 |
| 3,921,358 A | 11/1975 | Bettoli | 52/314 |
| 4,162,342 A | 7/1979 | Schwartz | 428/159 |
| 4,174,420 A | 11/1979 | Anolick et al. | 428/310 |
| 4,229,329 A | 10/1980 | Bennett | 260/17 R |
| 4,250,029 A | 2/1981 | Kiser et al. | 210/652 |
| 4,357,436 A | 11/1982 | Zucker et al. | 524/448 |
| 4,495,238 A | 1/1985 | Adiletta | 428/215 |
| 4,504,991 A | 3/1985 | Klancnik | 5/698 |
| 4,600,634 A * | 7/1986 | Langer | 428/220 |
| 4,613,627 A | 9/1986 | Sherman et al. | 521/68 |
| 4,717,614 A | 1/1988 | Bondoc et al. | 428/143 |
| 4,745,032 A | 5/1988 | Morrison | 428/215 |
| 4,746,560 A | 5/1988 | Goeden | 428/151 |
| 4,746,565 A | 5/1988 | Bafford et al. | 442/243 |
| 4,784,897 A | 11/1988 | Brands | 428/219 |
| 4,935,232 A | 6/1990 | McIntosh | 424/409 |
| D309,027 S | 7/1990 | Noone et al. | D25/139 |
| 4,994,317 A * | 2/1991 | Dugan et al. | 442/72 |
| 5,001,005 A | 3/1991 | Blanpied | 428/283 |
| 5,086,084 A | 2/1992 | Michaelson | 521/137 |
| 5,091,243 A | 2/1992 | Tolbert et al. | 428/253 |
| 5,110,839 A | 5/1992 | Chao | 521/83 |
| 5,130,191 A | 7/1992 | Pole | 428/332 |
| 5,232,530 A | 8/1993 | Malmquist et al. | 156/78 |
| 5,312,863 A | 5/1994 | Van Rheenen et al. | 524/555 |
| 5,338,349 A | 8/1994 | Farrar | 106/18.12 |
| 5,345,738 A * | 9/1994 | Dimakis | 52/309.9 |
| 5,369,929 A | 12/1994 | Weaver et al. | 52/557 |
| D369,421 S | 4/1996 | Kiik et al. | D25/139 |
| 5,540,980 A | 7/1996 | Tobert et al. | 428/215 |
| 5,578,403 A | 11/1996 | Watanabe et al. | 430/7 |
| 5,609,957 A | 3/1997 | Page et al. | 428/372 |
| 5,611,186 A | 3/1997 | Weaver | 52/557 |
| 5,666,776 A | 9/1997 | Weaver et al. | 52/557 |
| 5,713,974 A | 2/1998 | Martin et al. | 65/17.2 |
| 5,717,012 A | 2/1998 | Bondoc et al. | 524/13 |
| 5,965,257 A | 10/1999 | Ahluwalia | 428/357 |
| 5,997,887 A | 12/1999 | Ha et al. | 424/401 |
| 6,013,270 A | 1/2000 | Hargraves et al. | 424/401 |
| 6,051,193 A | 4/2000 | Langer et al. | 422/179 |
| 6,093,481 A | 7/2000 | Lynn et al. | 428/217 |

(Continued)

FOREIGN PATENT DOCUMENTS

CA      1073600      3/1980

(Continued)

OTHER PUBLICATIONS

Ohlemiller et al., *Flammability Assessment Methodology for Mattresses*, NISTIR 6497, Jun. 2000.

(Continued)

*Primary Examiner* — Andrew T Piziali
(74) *Attorney, Agent, or Firm* — Fitzpatrick, Cella, Harper & Scinto

(57) ABSTRACT

A composite material comprising a substrate having an ionic charge which is coated with a coating having essentially the same ionic charge and a metallic component adhered on one or both sides of the coated substrate. The coating consists essentially of a filler material comprising clay and a binder material. The substrate is preferably fiberglass, the filler material may further comprise at least one additional filler selected from the group consisting of decabromodiphenyloxide, antimony trioxide, fly ash, charged calcium carbonate, mica, glass microspheres and ceramic microspheres and mixtures thereof and the binder material is preferably acrylic latex. The metallic component is preferably aluminum foil. The composite material has heat insulating and fire resistant characteristics.

19 Claims, No Drawings

U.S. PATENT DOCUMENTS

| | | | |
|---|---|---|---|
| 6,136,216 A | 10/2000 | Fidler et al. | 252/62 |
| 6,145,265 A | 11/2000 | Malarkey et al. | 52/555 |
| 6,207,738 B1 | 3/2001 | Zuckerman et al. | 524/156 |
| 6,228,497 B1 * | 5/2001 | Dombeck | 428/392 |
| 6,289,648 B1 | 9/2001 | Freshwater et al. | 52/557 |
| 6,341,462 B2 | 1/2002 | Kiik et al. | 428/352 |
| 6,365,533 B1 * | 4/2002 | Horner et al. | 442/374 |
| 6,397,546 B1 | 6/2002 | Malarkey et al. | 452/518 |
| 6,500,560 B1 | 12/2002 | Kiik et al. | 428/489 |
| 6,503,976 B2 | 1/2003 | Zuckerman et al. | 524/156 |
| 6,514,362 B1 | 2/2003 | Zuckerman et al. | 156/79 |
| 6,586,353 B1 | 7/2003 | Kiik et al. | 442/320 |
| 6,660,667 B2 | 12/2003 | Zuckerman et al. | 442/131 |
| 6,673,432 B2 | 1/2004 | Kiik et al. | 428/301.1 |
| 6,708,456 B2 | 3/2004 | Kiik et al. | 52/98 |
| 6,872,440 B1 | 3/2005 | Kiik et al. | 428/141 |
| 2003/0040241 A1 | 2/2003 | Kiik et al. | 442/242 |
| 2003/0054717 A1 | 3/2003 | Ahluwalia | 442/136 |
| 2003/0176125 A1 | 9/2003 | Ahluwalia | 442/59 |
| 2003/0224679 A1 | 12/2003 | Ahluwalia | 442/72 |
| 2003/0228460 A1 | 12/2003 | Ahluwalia | 428/315.5 |
| 2004/0121114 A1 | 6/2004 | Piana et al. | 428/85 |
| 2004/0229052 A1 | 11/2004 | Ahluwalia et al. | 428/457 |
| 2004/0229053 A1 | 11/2004 | Ahluwalia et al. | 428/457 |
| 2004/0229054 A1 | 11/2004 | Ahluwalia et al. | 428/457 |
| 2005/0144728 A1 | 9/2005 | Jones et al. | 5/698 |
| 2005/0214555 A1 | 9/2005 | Ahluwalia | 428/489 |
| 2005/0215149 A1 | 9/2005 | Ahluwalia | 442/152 |
| 2005/0215150 A1 | 9/2005 | Ahluwalia | 442/152 |
| 2005/0215151 A1 | 9/2005 | Ahluwalia | 442/152 |
| 2005/0215152 A1 | 9/2005 | Ahluwalia | 442/152 |

FOREIGN PATENT DOCUMENTS

| | | | | |
|---|---|---|---|---|
| DE | 19729533 | 1/1999 | | |
| EP | 0388338 | 9/1990 | | |
| EP | 0391000 | 10/1990 | | |
| GB | 926749 | 5/1963 | | |
| GB | 1228592 | 4/1971 | | |
| GB | 2167060 | 5/1986 | | |
| GB | 2167060 A * | 5/1986 | | 106/217.01 |
| RU | 564374 | 8/1977 | | |
| WO | WO 95/34609 | 12/1995 | | |
| WO | WO 99/00338 | 1/1999 | | |
| WO | WO 01/40568 | 6/2001 | | |
| WO | WO 01/63986 | 8/2001 | | |
| WO | WO 02/00425 | 1/2002 | | |
| WO | WO 02/00427 | 1/2002 | | |
| WO | WO 02/46550 | 6/2002 | | |
| WO | WO 03/024881 | 3/2003 | | |

OTHER PUBLICATIONS

State of California Department of Consumer Affairs Bureau of Home Furnishings and Thermal Insulation Technical Bulletin 129, Oct. 1992, *Flammability Test Procedure for Mattresses for use in Public Buildings*.

The Goodyear Tire & Rubber Company Chemical Division, *Latex Precipitation onto Pulp in Paper Beaters*, in *Tech-Book Facts: Latex*, Akron, Ohio.

Dong, *Fiberglass Surface and Its Electrokinetic Properties*, in *Nonwovens Conference & Trade Fair*, pp. 305-315, TAPPI Press, Atlanta, Georgia, Mar. 1998.

Stassen, *Dispersing Glass Fibers in the Wet Process*, in *Nonwovens Conference & Trade Fair*, pp. 7-12, TAPPI Press, Atlanta, Georgia, 1983.

Popovics, *Concrete Materials: Properties, Specifications and Testing*, pp. 375, 394, Noyes Publications, New Jersey, 1992.

Endur-All Technologies, Inc., *Using Durathon™ to Re-engineer the Residential Roofing Industry*, Endur-All Technologies, Inc., Colorado, 2001.

* cited by examiner

US 8,017,531 B2

COMPOSITE MATERIAL

CROSS REFERENCE TO RELATED APPLICATIONS

This application is a continuation-in-part of U.S. application Ser. No. 09/955,395 filed on Sep. 18, 2001, now U.S. Pat. No. 6,858,550, of U.S. application Ser. No. 10/354,216, filed on Jan. 29, 2003, now abandoned; of U.S. application Ser. No. 10/354,220, filed on Jan. 29, 2003, now abandoned; and of U.S. application Ser. No. 10/354,219, filed Jan. 29, 2003, now U.S. Pat. No. 7,521,385.

FIELD OF THE INVENTION

This invention relates to composite materials comprising a substrate having an ionic charge coated with a coating having essentially the same charge and consisting essentially of a filler material and a binder material, wherein the composite material further includes a metallic component on one or more sides. The filler material includes clay. The composite materials of the present invention exhibit unexpected heat insulating and fire resistant properties.

BACKGROUND OF THE INVENTION

For many years substrates such as fiberglass have been coated with various compositions to produce materials having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony trioxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA). The glass fibers, non-glass filler material and non-asphaltic binder are all mixed together to form the facer sheets.

U.S. Pat. No. 4,745,032 discloses an acrylic coating comprised of one acrylic underlying resin which includes fly ash and an overlying acrylic resin which differs from the underlying resin.

U.S. Pat. No. 4,229,329 discloses a fire retardant coating composition comprising fly ash and vinyl acrylic polymer emulsion. The fly ash is 24 to 50% of the composition. The composition may also preferably contain one or more of a dispersant, a defoamer, a plasticizer, a thickener, a drying agent, a preservative, a fungicide and an ingredient to control the pH of the composition and thereby inhibit corrosion of any metal surface to which the composition is applied.

U.S. Pat. No. 4,784,897 discloses a cover layer material on a basis of a matting or fabric, which is especially for the production of gypsum boards and polyurethane hard foam boards. The cover layer material has a coating on one side, which comprises 70% to 94% powdered inorganic material, such as calcium carbonate, and 6% to 30% binder. In addition, thickening agents and cross-linking agents are added and a high-density matting is used.

U.S. Pat. No. 4,495,238 discloses a fire resistant thermal insulating composite structure comprised of a mixture of from about of 50% to 94% by weight of inorganic microfibers, particularly glass, and about 50% to 6% by weight of heat resistant binding agent.

U.S. Pat. No. 5,091,243 discloses a fire barrier fabric comprising a substrate formed of corespun yarns and a coating carried by one surface of the substrate. The coating comprises a carbonific compound, a catalyst and a source of a nonflammable gas. The coating additionally comprises thickening agents and blowing agents.

U.S. Pat. No. 6,228,497 teaches a fire resistant glass fiber which is made by mixing together glass fibers, a binder and calcium carbonate. In addition, clay may be added to improve fire resistance.

U.S. Pat. No. 4,994,317 teaches a multilayered fire resistant material which comprises a flame durable textile fabric substrate, a flexible silicone polymer layer, and a heat reflective paint. Clay may be added to the silicone layer to enhance flame resistance.

GB 2167060 teaches a fire resistant material comprising synthetic mineral fibers (including glass wool), clay and a binder. The fire resistant material is made by combining the components. The binder is preferably starch or modified starch; condensates of phenol, urea, melamine, resorcinol, tannin with aldehyde, isocyanates, reactive cements; binders formed in situ by inter-reaction between silica and calcium; hydraulic cements; and potassium and sodium silicates.

Many different coating compositions have been formulated over the years but often such compositions would bleed through substrates, such as fiberglass substrates, if the substrates were coated on just one side, unless the compositions had a high binder content and/or included viscosity modifiers to enhance the viscosity of the coating composition. To prevent bleed through, such coating compositions sometimes had their viscosity increased by blowing or whipping air into the compositions. Although such blown compositions did not bleed through to the other side of mats such as fiberglass mats, the raw material costs for the compositions were high because of the numbers of constituent elements involved.

U.S. Pat. No. 5,965,257, the entire disclosure of which is incorporated herein by reference, discloses a structural article having a coating, which includes only two major constituents, while eliminating the need for viscosity modifiers, for stabilizers or for blowing. The structural article of U.S. Pat. No. 5,965,257 is made by coating a substrate having an ionic charge with a coating having essentially the same ionic charge. The coating consists essentially of a filler material and a binder material. By coating the substrate with a coating having essentially the same ionic charge, the patentee developed a zero bleed through product while using only two major ingredients in the coating and eliminating the need for costly and time consuming processing steps such as blowing. Structural articles may thus be produced having a low binder content and no viscosity modifiers. U.S. Pat. No. 5,965,257 issued to Elk Corporation of Dallas, the assignee of the present application. Elk produces a product in accordance with the invention of U.S. Pat. No. 5,965,257 which is marketed as VersaShield®.

U.S. patent application Ser. No. 09/955,395, filed on Sep. 18, 2001, to which this application claims priority as a continuation-in-part, relates to fire resistant fabric materials comprising a substrate having an ionic charge coated with a coating having essentially the same charge and consisting essentially of a filler material and a binder material. The filler material includes clay. The fire resistant fabric material of U.S. patent application Ser. No. 09/955,395 is drapable and can be used as a fabric material or as a backing for a fabric material, such as a backing for mattress ticking. The present invention is based in part on the unexpected discovery that the inclusion of a metallic component on the fire resistant fabric materials of U.S. patent application Ser. No. 09/955,395 surprisingly results in a composite material with superior heat insulating properties and fire resistant properties that is still flexible.

U.S. patent application Ser. No. 10/354,216, filed on Jan. 29, 2003, to which this application claims priority as a continuation-in-part, relates to fire resistant structural materials and to fire resistant fabric materials made therefrom. The structural materials comprise a surfactant component, surfactant generated microcells, a filler component and a binder component. The structural material is fire resistant. The structural material may be used to coat a substrate to make fire resistant fabric materials.

U.S. patent application Ser. No. 10/354,220, filed on Jan. 29, 2003, to which this application claims priority as a continuation-in-part, relates to a structural material comprising a prefabricated microcell component, a surfactant component, a surfactant-generated microcell component, a filler component and a binder component. The prefabricated microcell component is essentially a hollow sphere or a component capable of forming a hollow sphere that has been constructed or manufactured before being employed in the structural material. The structural material may be used to coat a substrate to make a fire resistant fabric material.

U.S. patent application Ser. No. 10/354,219, filed on Jan. 29, 2003, to which this application claims priority as a continuation-in-part, relates to a structural material comprising a surfactant component, surfactant-generated microcells, a gel catalyst component and a binder component. The structural material may further comprise a filler component. The structural material may be used to coat a substrate to make a fire resistant fabric material.

SUMMARY OF THE INVENTION

The present invention relates to a composite material comprising a substrate having an ionic charge coated with a coating having essentially the same ionic charge, wherein the composite material includes a metallic component adhered to the coated substrate. If the substrate is planar and is coated on one side with the coating, then the metallic component may be adhered to the coated side and/or to the uncoated side of the substrate. If a planar substrate is coated on both sides, then the metallic component may be adhered to either or both of the coated sides.

The substrate may be any suitable reinforcement material capable of withstanding processing temperatures and is preferably fiberglass, such as a woven and non-woven fiberglass mat. The coating consists essentially of a filler and a binder. The binder is preferably acrylic latex and the filler comprises clay and may further include an additional filler selected from the group consisting of antimony trioxide, decabromodiphenyloxide, charged calcium carbonate, fly ash, mica, glass or ceramic microspheres and mixtures thereof. The metallic component may be any metallic component known in the art that is capable of imparting heat insulating and fire resistant characteristics. In a preferred embodiment, the metallic component is a foil, and more preferably, aluminum foil.

The heat insulating, fire resistant composite material may be used on its own or in conjunction with (e.g. as a liner for) other materials. For example, it may be applied to a structural article, such as building materials (e.g. gypsum board and siding materials, including sheathing) to obtain a heat insulating, fire resistant structural article.

DETAILED DESCRIPTION

In accordance with the invention, a composite material is made by coating a substrate having an ionic charge with a coating having essentially the same ionic charge, wherein the composite material includes a metallic component adhered to the coated substrate on one or both sides. As used herein, the term "coated substrate" means a material wherein at least a part of the substrate is coated with the coating. The metallic component may be adhered to the coated side and/or to the uncoated side of the coated substrate. The coating consists essentially of a filler material and a binder material. By coating the substrate with a coating having essentially the same ionic charge, the applicant has developed a composite material while using mainly two major ingredients in the coating and eliminating the need for viscosity modifiers, thickening agents and costly and time consuming processing steps such as blowing. The metallic component may be any metallic component capable of imparting heat insulating characteristics to the composite materials of the present invention. The metallic component may be a metal film or foil, or it may be sprayed onto the first layer or onto the substrate and then heat dried in an oven. Examples of metallic components include aluminum and stainless steel. In a preferred embodiment, the metallic component is an aluminum foil and is applied to the coated side of the composite material during the material making process, before the coating is cured. In such an embodiment, the aluminum foil adheres to the substrate by adhesive means. When the metallic component is applied directly to the substrate on the uncoated side of the material, an adhesive is employed to facilitate adherence. When there are concerns of corrosion, for example for use in a car, or for use in applications that include batteries, it may be preferred that the metallic component is stainless steel, such as in the form of a foil.

The substrate of the composite materials of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

Examples of substrates in accordance with the invention include, inter alia, glass, fiberglass, ceramics, graphite (carbon), PBI (polybenzimidazole), PTFE, polyaramides, such as KEVLAR™ and NOMEX™, metals including metal wire or mesh, polyolefins such as TYVEK™, polyesters such as DACRON™ or REEMAY™, polyamides, polyimides, thermoplastics such as KYNAR™ and TEFZEL™, polyether sulfones, polyether imide, polyether ketones, novoloid phenolic fibers such as KYNOL™, KoSa™ polyester fibers, JM-137 M glass fibers, Owens-Corning M glass, Owens-Corning K glass fibers, Owens-Corning H glass fibers, Evanite 413M glass microfibers, Evanite 719 glass microfibers, cellulosic fibers, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which may also may be used. The cellulosic fibers may be natural cellulose such as wood pulp, newsprint, Kraft pulp and cotton and/or chemically processed cellulose such as rayon and/or lyocell. Examples of woven materials that may be useful in the present invention include continuous fiberglass veils, such as Pearlveil™ 110, Pearlveil™ 210, Curveil™ 120, Curveil™ 220, Flexiveil™ 130, Flexiveil™ 230 and Pultrudable veil (all available from Schmelzer Industries, Inc., Somerset, Ohio). The non-woven materials may be Airlaid™ (Precision Fabrics Group, North Carolina) and Spunbond™ (Freudenberg Non-Woven, North Carolina). Nonlimiting examples of filament materials include C, DE, G, H, K, M filaments (glass fiber filaments of differing thicknesses) of various grades, including electrical grade, chemical grade and high strength grade (all available from BFG Industries, Inc. of Greensboro, N.C.). As used herein, a fiberglass mat includes nonwoven and woven fiberglass mats. In a preferred embodiment, the substrate is a woven fiberglass mat. In another preferred embodiment, the fiberglass mat is a non-woven mat which comprises from about 70-95% H glass filaments, from about 0-5% Evanite microglass at 4.5 microns, from about 0-15% polyester fiber (50/50 mix of ¼ inch and ½ inch length), and from about 5-10% acrylic based binder with a glass transition temperature (Tg) at 18° F.

As stated above, the filler material of the present invention includes clay. The clay may be Paragon™, which is soft clay (i.e. it is soft to the touch), Suprex™, which is hard clay (i.e. it is hard to the touch), Suprex™ amino silane treated clay, which is used for crosslinking, since it will chemically bond with binder, and for highloading and Ballclay™, which has elastic properties (i.e. it feels rubbery). All of the above-listed clay products are available, for example, from Kentucky-Tennessee Clay Company of Langley, S.C. In a preferred embodiment, the clay is Ballclay™ 3380 which is particularly inexpensive compared to other clays. In the present invention, clay is preferred because of its elongation properties (it has a low modulus), its abrasion resistance, its tear resistance, and its tensile strength. Moreover, clay is a good heat barrier; it does not disintegrate when an open flame (temperature $\geq$1500° F.) is applied directly to a coating of the present invention that includes clay. In addition, clay provides a slick, elastic, glassy surface which exhibits flexibility. Furthermore, as noted, clay is inexpensive and thus can provide a low cost composite material.

The filler material may further comprise an additional filler selected from the group consisting of decabromodiphenyloxide (FRD-004, Tiarco Chemicals, Dalton, Ga.), antimony trioxide, charged calcium carbonate, fly ash (such as Alsil O4TR™ class F fly ash produced by JTM Industries, Inc. of Martin Lake and Jewett, Tex. which has a particle size such that less than 0.03% remains on an agitated 0.1 inch×0.1 inch screen), 3-X mineralite mica (available from Engelhard, Inc. of Louisville, Ky.) and glass or ceramic microspheres (glass microspheres are 2.5 times lighter than ceramic microspheres and also provide fire resistance), or any mixture of these filler materials to meet desired cost and weight criteria. Glass and ceramic microspheres are manufactured by Zeelan Industries of 3M Center Bldg., 220-8E-04, St. Paul, Minn. 55144-1000. Calcium carbonate may be obtained from Franklin Industrial Minerals of 612 Tenth Avenue North, Nashville, Tenn. 37203.

Calcium carbonate, talc and fly ash filler increase the weight of the product, but utilization of glass and/or ceramic microspheres enables the manufacture of a product with reduced weight and increased fire resistant properties. Clay may impart to the product the following nonlimiting characteristics: (1) lower heat build-up, (2) heat reflectance properties, (3) fire barrier properties, (4) no weight loss when exposed to heat and open flame, and (5) reduced disintegration when exposed to heat and open flame. Decabromodiphenyloxide and antimony trioxide impart the following nonlimiting characteristics: (1) flame retardant properties, (2) capability of forming a char, and (3) capability of stopping the spread of flames. It is believed that the gas produced from the heating of the decabromodiphenyloxide can also act as a flame retardant because the gas uses up oxygen or depletes oxygen in the layer next to the fabric and suppresses or stops the fire from further progression.

Glass and ceramic microspheres can withstand heat greater than 2000° F. Also, glass and ceramic microspheres increase compressive strength, absorb no latex and/or water and thus permit the faster drying of the product. Glass and ceramic microspheres also increase product flexibility.

Further, the glass and ceramic microspheres help to increase the pot life of the coating. Heavier particles in the fillers, although they may comprise but a small percentage of the particles in the filler, have a tendency to settle near the bottom of a storage vessel. When glass and/or ceramic microspheres are mixed together with another filler, a dispersion is produced which has an increased pot life or shelf life. Without wishing to be bound by any particular theory, it is believed that as the filler particles naturally fall in the vessel and the glass and ceramic microspheres rise, the smaller size filler particles are supported by the glass and/or ceramic microspheres, thus enabling the microspheres to stay in solution and preventing the filler particles, to at least some extent, from descending to the bottom of the vessel.

The composite materials of the present invention may be employed to make heat insulating, fire resistant building materials. Such building materials may be prepared during the building materials making process to include the composite materials of the present invention, or the composite materials may be utilized after building materials have already been installed. The composite materials may be used on their own or in conjunction with (e.g. as a liner for) other materials. For example, they may be applied to a structural article, such as building materials (e.g. gypsum board and siding materials, including sheathing) to obtain a heat insulating, fire resistant structural article. Such a structural article is useful for providing effective fire walls in buildings, including homes, and can provide a greater escape time and reduced heat exposure for the occupants of the building. In addition, the composite materials of the present invention may be applied to attic ceilings. The composite materials may be used to surface a roof prior to the application of roofing materials, or they may comprise part of a roofing material.

The composite materials may further be used to impart heat insulation and fire resistance to other objects, such as motor vehicles, trains, aircrafts, space ships, heating units, air conditioners, washing machines, dryers, furniture, mattresses and any other objects for which heat insulating and fire resistance properties are desired, such as upholstered articles, bedroom articles, (including children's bedroom articles), draperies, carpets, tents, awnings, fire shelters, sleeping bags, ironing board covers, barbecue grill covers, fire resistant gloves, airplane seats, engine liners, and fire-resistant clothing for race car drivers, fire fighters, jet fighter pilots, astronauts, facing sheets, building air duct liners, roofing underlayment (or roofing felt), underlayment for organic, built up roofing materials, roll roofing, modified roll products, filter media (including automotive filters), automotive hood liners, head liners, fire walls, vapor barriers etc. The use of the composite materials of the present invention in articles may enable the articles to exceed current flammability standards.

Composite materials made in accordance with this invention may be of any shape. Preferably, such articles are planar in shape. The composite materials of the present invention are flexible and pliable. In addition they are durable and preferably do not crack upon bending.

In making the composite material, a planar substrate may be coated on one side or both sides depending on the intended application. As used herein, "coated on one side or both sides" means that the coating coats at least a part of one side or at least a part of both sides of the substrate. For instance, if one side of the substrate is coated with the filler/binder coating, the other surface may be coated with another material. In the roofing materials industry, for example, the other material may be conventional roofing asphalt, modified asphalts and non-asphaltic coatings, and the article may then be topped with roofing granules. It is believed that such roofing material could be lighter in weight, offer better fire resistance and better performance characteristics (such as cold weather flexibility, dimensional stability and strength) than prior art roofing materials.

Additionally, the composite material may be coated with a water repellent material or the water repellant material may be added in the coating (i.e. internal water proofing). Two such water repellant materials are Aurapel™ 330R and Aurapel™ available from Sybron/Tanatex of Norwich, Conn. In addition, Omnova Sequapel™ and Sequapel 417 (available from Omnovasolutions, Inc. of Chester, S.C.); BS-1306, BS-15 and BS-29A (available from Wacker of Adrian, Mich.); Syl-ff™-7922, Syl-off™-1171A, Syl-off™-7910 and Dow Corning 346 Emulsion (available from Dow Corning, Corporation of Midland, Mich.); Freepel™-1225 (available from BFG Industries of Charlotte, N.C.); and Michem™ Emulsion-41740 and Michem™ Emulsion-03230 (available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellant materials.

A defoamer may also be added to the coating of the present invention to reduce and/or eliminate foaming during production. One such defoamer is Drew Plus Y-250 available from Drews Inductrial Division of Boonton, N.J. In addition, ionic materials may be added to increase the ionic charge of the coating, such as ammonium hydroxide, Natrosol-NEC™ available from Hercules of Wilmington, Del.) and ASE-95NP and ASE-60 (available from Rohm & Haas of Charlotte, N.C.).

Fire retardant materials may also be added to the first layer of the composite materials of the present invention to further improve the fire resistance characteristics. Nonlimiting examples of fire retardant materials which may be used in accordance with the present invention include FRD-004 (decabromodiphenyloxide; Tiarco Chemiclas, Dalton, Ga.), FRD-01, FR-10, FR-11, FR-12, FR-13, FR-14 (all available from Tiarco Chemicals), zinc oxide, and aluminum trihydrate (ATH).

Further, heat insulating and fire resistant composite materials made in accordance with the invention may be coated with an algaecide such as zinc powder, copper oxide powder or the herbicides Atrazine available from e.g. Ribelin Inductries or Diuron avaibable from e.g. Olin Corporation, and antifungal material such as Micro-Chek™ 11P, an antibacterial material such as Micro-Check™ 11-S-160, a surface friction agent such as Byk™-375, a flame retardant material such as ATH (aluminum trihydrate) available from e.g. Akzo Chemicals and antimony trioxide available from e.g. Laurel Inductries. In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impact desired characteristics, such as a desired color. The Micro-Chek™ products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich.

The additional coatings of e.g. water repellant material, antifungal material, antibacterial material, etc., may be applied to one or both sides of composite materials otherwise having filler/binder coating on one of both sides of the substrate. For example, heat insulating, fire resistant composite materials comprising substrates coated on one or both sides with filer/binder coatings could be coated on one side with a water repellant composition and on the other side with an antibacterial agent. Alternatively, the water repellant material, antifungal material, antibacterial material, etc., may be added to the coating before it is used to coat the substrate.

As indicated, the heat insulating, fire resistant composite structural material of the present invention is useful in the manufacture of mattresses, particularly mattress borders. In mattress border embodiments, the composite structural material is placed either directly beneath the outer ticking layer or beneath a foam layer (preferably ¼" polyurethane foam) that is itself beneath the ticking layer. In this embodiment, the composite material may be used to line a decorative mattress fabric to produce a heat insulating, fire resistant mattress fabric. Nonlimiting examples of mattress fabrics include ticking (known in the art as a strong, tightly woven fabric comprising cotton or linen and used especially to make mattresses and pillow covering), or fabrics comprising fibers selected from the group consisting of cotton, polyester, rayon, polypropylene, and combinations thereof. The lining may be achieved by methods known in the art. For example, the composite material of the present invention may simply be placed under a mattress fabric. Or, the heat insulating, fire resistant composite material may be bonded or adhered to the mattress fabric, for example using a flexible and preferably nonflammable glue or stitched with fire resistant thread i.e., similar to a lining, to make a heat insulating, fire resistant mattress fabric. The fire resistant mattress fabric of the present invention may then be used by the skilled artisan to manufacture a mattress product which has improved flammability characteristics.

Further materials which may be incorporated into the mattress products, particularly mattress borders, include construction materials, such as non fire retardant or fire retardant thread for stitching the mattress materials together (e.g. glass thread or Kevlar thread) and non-fire retardant or fire retardant tape. Silicon may be used with Kevlar thread to diminish breakage and enhance production time.

Fire resistant composite materials made in accordance with the present invention may be used in conjunction with foamed heat insulating materials made by any of the known methods for making foamed compositions such as, for example, aeration by mechanical mixing and the other techniques described in U.S. Pat. No. 5,110,839.

The table below provides, in percentages, the components of the coating that the applicants believe would be useful in a preferred embodiment of the invention.

TABLE I

| Coating Components | % Wet | % Dry |
|---|---|---|
| BINDER | | |
| BFG Hycar ™ 2679 Latex | 25.00 | 29.43 |
| Cymel ™ 373 | 3.70 | 6.97 |
| Rhoplex ™ TR-407 | 4.50 | 5.30 |
| FILLER | | |
| Clay - mattress grade | 34.60 | 55.40 |
| WATER REPELLANT MATERIAL | | |
| Natrosol HEC ™ | 0.05 | 0.11 |
| Aurapel-391 ™ | 2.50 | 1.06 |
| Acrysol ™ ASE-95NP | 0.50 | 0.21 |
| MISCELLANEOUS | | |
| Water | 27.42 | 0.75 |
| Ammonium Hydroxide | 1.13 | 0.24 |
| Y-250 defoamer | 0.10 | 0.52 |
| W-4123 Blue Pigment | 0.50 | |
| Total Percentage | 100% | 100% |

Although the table shows clay as the filler component of the coating, it is believed that combinations of clay with other fillers may be employed. Any changes in the combination of fillers should maintain the density, viscosity, fire resistance properties and low cost coating. The density, viscosity and fire resistance properties can be ascertained by the skilled artisan and are further described in Example 1 below.

The coating is prepared by using a binder material such as a high performance heat-reactive acrylic latex polymer to bond the filler materials together and to bond the filler to the substrate. Such a binder material is Hycar™ 2679 acrylic latex polymer supplied by B.F. Goodrich Company of Cleveland, Ohio. Binder components may also include Cymel™ 373 (available from American Cyanamid), RHOPLEX™ TR 407 and R&H GL-618 latex both available from Rohm & Haas, and Borden FG-413F UF resin (available from Borden). It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

The coating comprises approximately 80% by weight of the composite material. In the wet coating, about 95% to about 80% by weight is filler and from about 5% to about 20% is acrylic binder. In a preferred embodiment, the wet coating comprises about 90% filler and about 10% binder. The filler is preferably clay. The substrate is preferably comprised of about 97.5% to 80% by dry weight Owens-Corning H Glass ½" and 2.5% to 20% by dry weight Evanite 719 Glass Microfiber. The substrate is approximately 5% to 10% by weight of the composite material. The binder which bonds together the glass fibers is preferably Rohm & Haas GL-618 Latex, Borden FG-413F UF Resin and Cymel 373 (Borden). The metallic component is preferably aluminum foil and is approximately 5% to 10% by weight of the composite material.

The substrate may be coated by air spraying, dip coating, knife coating, roll coating or film application such as lamination/heat pressing. The coating may be bonded to the substrate by chemical bonding, mechanical bonding and/or thermal bonding. Mechanical bonding is achieved by force feeding the coating onto the substrate with a knife.

Example I

To produce the composite materials of the present invention, the applicant formulated the coating using just three major components, water, filler and binder (see Table I above). The amounts of the major constituents were as follows: approximately 27.42% water, 25% Hycar 2679, and 34.60% clay (dry percentages are 0%, 29.43% and 55.40% respectively). The binders Cymel 373 (approximately 3.70% wet/6.97% dry) and Rhoplex TR-407 (approximately 4.50% wet and 5.30% dry) were also used. In total, the binder and filler made up 67.80% wet and 97.10% dry of the total coating. Dye and defoaming agent made up less than 1.00% of the dry formulation, water repellant made up less than 2.00% of the dry formulation, ionic material (ammonium hydroxide) made up less than 1.00% of the dry formulation. The defoaming agent was Drew Plus Y-250. The materials were mixed in a reaction or mixing kettle for 45 minutes.

The coating was used to coat woven and non-woven fiberglass mats on one and both sides. The woven mat was manufactured by Elk Corporation of Ennis, Tex. and had a basis weight in the range of 1.4 lb./sq. to 2.0 lb./sq. The mat had a porosity in the range of 800 to 1,000 cfm/ft$^2$. The non-woven mat comprises from about 80% to 97.5% H glass filaments, from about 2.5% to 20% Evanite microglass, from about 0-15% polyester fiber (50/50 mix of ¼ inch and ½ inch length, and from about 5-30% acrylic based binder. Generally, when such highly porous mats have been coated on one side only, the coating bleeds through to the other side. In accordance with the present invention however, the novel coating comprising clay coated the surface of the fiberglass mat very well and did not bleed through to the other side of the mat. The coated article was durable and flexible and did not crack on bending. Typical tensile strength measurements for uncoated versus coated were 75 lbs/3" and 217 lbs/3" respectively. Typical Elmendorff tear strength measurements were z 3200 grams without the sample tearing.

While the coating was still wet, aluminum foil (standard, commercially available foil) was laid on top of the coating. An adhesive bond was formed between the coating and the foil when the coating was dried. However, other means for adhering the metallic component and the coated substrate such as gluing and/or stitching may be employed.

When the substrate is coated on only one side with the coating, and when the metallic component is adhered directly to the substrate on the uncoated side, an adhesive is employed to achieve adherence. The heat insulating and fire resistant composite material was checked for combustibility. A cotton ball test was performed to determine whether, when exposed to the flame of a Bunsen Burner, a cotton ball placed on top of the composite materials of the invention and on the other side of the flame, would be protected from the flame. Three samples were tested: (1) composite material lacking aluminum foil; (2) the composite material of the present invention which included aluminum foil; and (3) VersaShield® material of U.S. Pat. No. 5,965,257 with aluminum foil adhered thereto.

When exposed to the flame of a Bunsen Burner from a distance of two inches the cotton ball burned in from 1 to 5 minutes when placed on top of the composite material which did not include the foil. In comparison, the cotton ball did not burn even after 8.5 hours when placed on top of the composite material of the present invention which includes aluminum foil and when the Bunsen Burner flame was two inches beneath the inventive composite material. The coated substrate prevented the flame from passing through to the foil and the foil dissipated or radiated the heat so that the cotton did not ignite. The cotton ball burned after 14 minutes when placed on top of a composite material comprised of aluminum foil and the structural article of U.S. Pat. No. 5,965,257 and when the Bunsen Burner flame was two inches below the foil/structural article material. The heat insulating, fire resistant composite materials of the present invention provide a comparatively high level of protection from heat and flames.

Surprisingly, when the coating of the present invention was used to coat the fiberglass mat on one side, it did not bleed through to the other side even though the coating had a relatively low viscosity of approximately 1000 cp. Although not wishing to be bound by any particular theory, the applicants believe that the coating did not bleed through the mat because the fiberglass mat is anionic and the coating of the present invention (when wet) includes a combination of water and Hycar 2679 (which together are anionic) and clay filler. The addition of ammonium hydroxide and/or antimony trioxide may increase the anionic charge of the coating. The resultant formulation had a low viscosity believed to be due to the repulsion of charges of the anionic latex in water and the anionic clay/ammonium hydroxide. Although low viscosity is not a desired objective for coating a highly porous mat, a characteristic of the invention is that the coating does not bleed through regardless of the viscosity because the mat is also anionic and like charges repel each other just as the north pole of one magnet repels the north pole of another magnetic.

If desired, however, the viscosity of the coating can be increased through mixing. The water and latex solution to which filler and ammonium hydroxide were added is acidic in nature and, on prolonged mixing, there is some hydrolysis thereby increasing the viscosity of the coating. The longer or the more rapidly the coating is mixed, the higher the viscosity. However, the coating still maintains an essentially anionic charge and thus there is still repelling of charges between the coating and the substrate.

Whether slowly or rapidly mixed, the coatings of the present invention may be applied to the substrates in relatively uniform thin coats because the like charges among the filler and acrylic latex elements in the coating repel one another. Thus, it is believed that the ionic charge repulsion characteristic which prevents the coating from bleeding through the mat also enables the application on the mat of a relatively uniform thin film coating. In instances where, due to price, supply or other considerations, the filler material to be employed has an ionic charge which is essentially the opposite of the charge of the substrate, modifiers are available to coat the filler material so that ultimately the coating and substrate of the article have essentially the same ionic charge. It is believed that viscosity modifiers could serve such a purpose.

The invention provides a heat insulating and fire resistant composite material which is flexible, pliable has good drapability characteristics and which shows no signs of cracking, etc. The coated fabric has a porosity of less than 10.4 cfm (uncoated has a porosity of 440 cfm) and adheres very well to other materials, including decorative fabrics, polyurethane foam, isocyanurate foam, asphaltic compounds, and granules (non-asphaltic shingle components).

The coated product may have few pinholes or may have numerous pinholes and still maintain a porosity of less than from approximately 5 to approximately 50 cfm when coated with solvent based adhesive such as Firestone Bonding Adhesive BA-2004 which does not bleed through the coated product.

The composite materials of the present invention were made water repellent by adding to the coating the water repellent materials listed above. The application of the coating to the substrate was accomplished by diluting the coating compound with water and then kiss coating the articles on one side while they were being coated on the other side by standard coating techniques which included the use of a doctor blade. The coating may also be performed by dip coating, scraping with a blade, or squeezing between two rolls having a gap that determines the thickness of the coating.

Prior to coating with a water repellent coating, the novel coating of the present invention can be treated with pigment or dye or any other suitable coloring means to give color to the composite materials of the invention. For instance, a W-4123 Blue Pigment (available from Engelhard of Louisville, Ky.) (0.5% by wet weight) was added to the coating composition to give color texture to the finished coating on the fiberglass mat.

Besides water repellent treatment, the composite materials of the present invention can be coated with antifungal, antibacterial and surface friction agents, an algaecide and/or a flame retardant material by mixing with the coating constituents prior to coating the substrate or by spraying on the partly finished articles at some point in the processing, e.g. between drying and curing.

Coating of the fiberglass substrates was accomplished using a hand-held coater which can be obtained from the Gardner Company, but any conventional method, such as dipping and flow coating from aqueous dispersion, and the like, followed by drying and baking, may be employed to coat the substrate as is well known in the art. Best coating results were observed using a Gardner profile 10 blade. While the coating was still wet, aluminum foil was laid on top of the coating. Then, the samples were placed in an oven at approximately 400° F. about 2.0 minutes to achieve drying and curing. When the coating was dry, an adhesive bond was formed between the aluminum foil and the coating. Additionally, the coating may be separately formed as a film of one or more components for subsequent combination with the substrate.

Hycar™ 2679 acrylic latex polymer has a low Brookfield viscosity of 100 cP. The low viscosity makes the polymer easily miscible with water and filler. This heat reactive acrylic polymer is compatible with all fillers due to its anionic charge. Products made with coatings which include the polymer are flexible at extreme high and low temperatures because the polymer has a glass transition temperature (Tg) of −3° C.

Hycar™ 2679 polymer emulsion contains a colloidal dispersion of polymer and copolymers in water, emulsifiers, such as synthetic soap (sometimes known as surface active agents or surfactants) and other ingredients such as buffers and protective colloids. These ingredients enable the polymer to be compatible with a wide variety of fillers. Without being bound to any particular theory, it is believed that Hycar™ 2679, with its thixotropic characteristics, enhances the viscosity of most fillers.

It should be understood that the above examples are illustrative, and that compositions other than those described above can be used while utilizing the principals underlying the present invention. For example, other sources of filler as well as mixtures of acrylic latex and/or surfactants can be used in formulating the heat insulating and fire resistant composite materials of the present invention. Moreover, the coating compositions can be applied to various types of substrates, as described above.

What is claimed is:

1. A heat insulating and fire resistant composite material comprising:
   (a) a substrate having an ionic charge;
   (b) a coating which coats the substrate having essentially the same ionic charge; and (c) a metallic component adhered to the coated substrate wherein said coating consists essentially of a filler material comprising clay and a binder material, and wherein said binder material bonds the filler material together and to the substrate and wherein said coating does not bleed through said substrate.

2. The composite material according to claim 1, wherein said filler further comprises at least one other filler selected from the group consisting of decabromodiphenyloxide, antimony trioxide, fly ash, charged calcium carbonate, mica, glass microspheres and ceramic microspheres and said binder is acrylic latex.

3. The composite material according to claim 1, wherein said substrate is planar and is coated on one side with said coating.

4. The composite material according to claim 1, wherein said substrate is planar and is coated on both sides with said coating.

5. The composite material according to claim 3 or 4 wherein said metallic component is adhered to one side of said coated substrate.

6. The composite material according to claim 3 or 4 wherein said metallic component is adhered to both sides of said coated substrate.

7. The composite material according to claim 1 wherein the metallic component is selected from the group consisting of aluminum and stainless steel.

8. The composite material according to claim 7, wherein the metallic component is aluminum foil.

9. The composite material according to claim 1, wherein said material further includes on one or both sides a water repellent material.

10. The composite material according to claim 1, wherein said material further includes on one or both sides an antifungal material.

11. The composite material according to claim 1, wherein said material further includes on one or both sides an antibacterial material.

12. The composite material according to claim 1, wherein said material further includes on one or both sides a surface friction agent.

13. The composite material according to claim 1, wherein said material further includes on one or both sides a flame retardant material.

14. The composite material according to claim 1, wherein said material further includes on one or both sides an algaecide.

15. The composite material according to claim 1, wherein said material is colored with dye.

16. A heat insulating and fire resistant composite material comprising:
 (a) a substrate which comprises glass fibers and wherein said composite material is from 5% to 10% by weight of the glass fibers;
 (b) a coating which coats the substrate consisting essentially of a filler material comprising clay and a binder material, wherein the coating is from 80% to 90% wet weight of said composite material; and
 (c) a metallic component adhered to the coated substrate, wherein said metallic component is from 5% to 10% by weight of said composite material.

17. The composite material according to claim 16 wherein said filler further comprises at least one filler selected from the group consisting of decabromodiphenyloxide, antimony trioxide, mica, fly ash, charged calcium carbonate, glass microspheres and ceramic microspheres.

18. The composite material according to claim 16, wherein the metallic component is selected from the group consisting essentially of aluminum and stainless steel.

19. The composite material according to claim 18, wherein the metallic component is aluminum foil.

* * * * *